Figure 1:
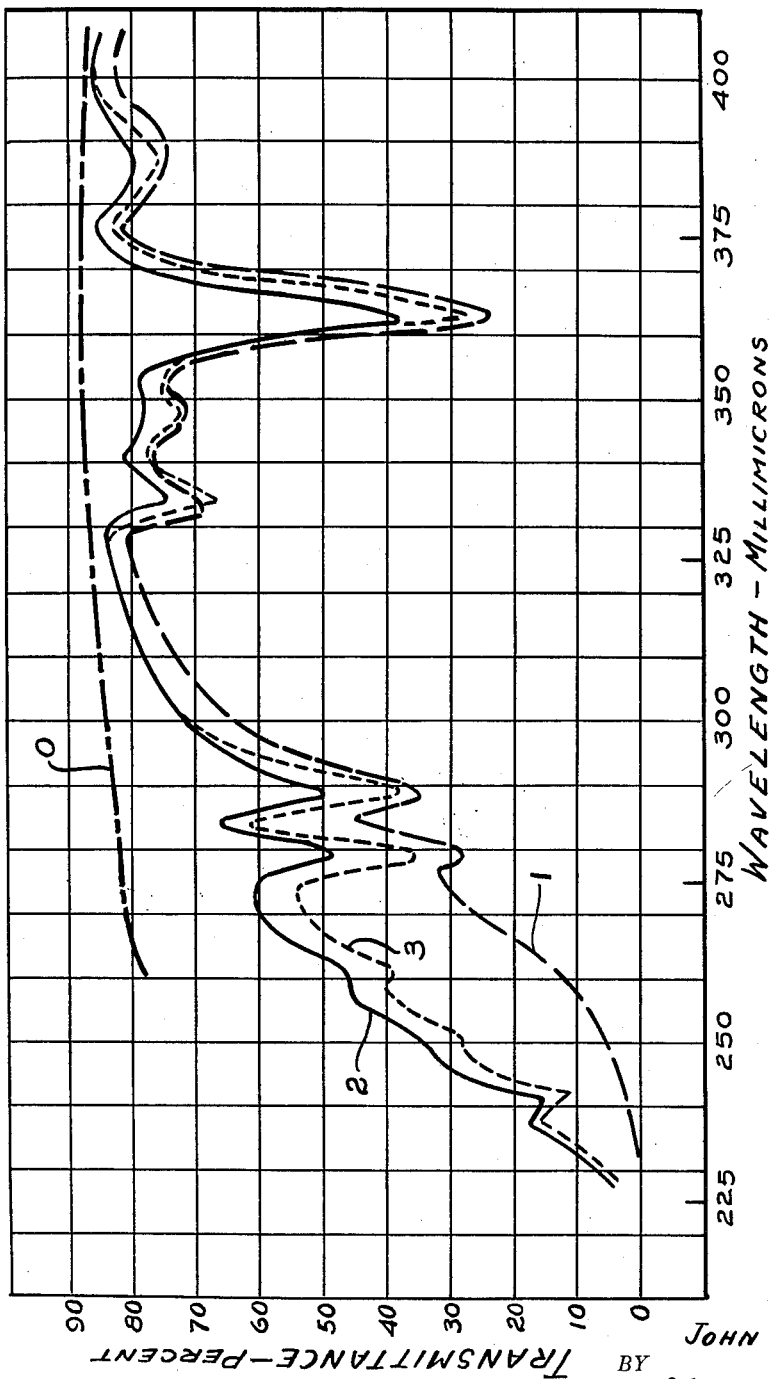

Feb. 20, 1962   J. H. CONNELLY   3,022,181
GLASS COLOR FILTER

Filed Feb. 1, 1961   3 Sheets-Sheet 1

INVENTOR.
JOHN H. CONNELLY
BY Clarence R. Patty Jr.
ATTORNEY

United States Patent Office 3,022,181
Patented Feb. 20, 1962

3,022,181
GLASS COLOR FILTER
John H. Connelly, Horseheads, N.Y., assignor to Corning Glass Works, Corning, N.Y., a corporation of New York
Filed Feb. 1, 1961, Ser. No. 86,384
2 Claims. (Cl. 106—52)

This invention relates to spectrophotometry, and in particular to a suitable glass filter for use as a standardizing means for making such measurements.

Spectrophotometers are widely utilized for analyzing solutions and the like to determine their chemical composition. The basis for such measurements depends upon the characteristics, transmission and/or absorption of particular wave-lengths of radiation from the ultra-violet region through the visible region into the near infra-red region; each chemical constituent exhibiting known effects on radiations of specific wave-lengths within such region. Thus it is possible to determine the composition of a sample, for instance a solution, by placing the unknown solution in a spectrophotometer and illuminating the transparent cell containing the unknown solution from one side and recording the amount of radiation transmitted by the cell. Thus by varying the wave-length of the incident radiation on one side of the cell through a wide spectrum of wave-lengths and simultaneously recording the transmittance, a curve is produced which has peaks and dips at specific wave-lengths. By comparing the values of wave-lengths at which significant peaks and valleys occur against known indices for chemical constituents, it is possible to determine the composition of the unknown solution.

However, in order to obtain accurate results it is necessary to ascertain that the transmission recording instrument is properly calibrated to accurately display the wave-lengths of the incident radiation. This is commonly done by the use of standardized cells, having known and invariable absorption peaks and dips, and making a calibration run so that the recording instrument may be adjusted to give proper readings. While standardized solutions are well known for such purpose, they are subject to change with time due to degradation and/or evaporation. Therefore, glasses have been developed which can be utilized for such purpose and which do not change their optical characteristics over long periods of time. However, glasses suitable for calibrating such instruments in the ultra-violet region of the spectrum have not been satisfactory because they do not exhibit sufficient transmittance of wave-lengths as short as about 240 millimicrons nor do they possess sharp transmittance peaks.

The principal object of this invention is to provide a color filter suitable for use in calibrating a spectrophotometer in the ultra-violet portion of the spectrum, particularly in the region of wave-lengths between about 240 and 400 millimicrons.

Another object of this invention is to provide a color filter which has significant absorption peaks and valleys in the visible and near-infra-red portion of the spectrum in addition to those in the ultra-violet region.

The drawings depict the transmission characteristics of filter glasses made according to the present invention.

I have now found that the object of this invention can be achieved by producing a color filter from a reduced alkali-baria-silicate glass containing 3–15% by weight of holmium oxide. While glasses containing about 10% by weight of $Ho_2O_3$ are preferred because such an amount of holmium oxide produces desirable peaks of significant amplitude, suitable glasses containing as little as 3% by weight of holmium oxide produce desirable peaks and dips. Furthermore, suitable glasses can be produced containing up to 15% holmium oxides, but such additional amounts over 10% do not significantly influence the amplitude of peaks and dips to warrant the additional cost of this constituent. Such glasses must be free of constituents which absorb ultra-violet radiations such as the oxides of cerium, iron, titanium, $As_2O_3$, or $Sb_2O_3$ or constituents which introduce other absorption peaks such as the other rare earth oxides and coloring oxides such as NiO, CoO, or $Cr_2O_3$. Likewise, as suitable glasses must be melted under reducing conditions, the glass batch must be free of constituents which are readily reduced to the metallic state such as $Bi_2O_3$, PbO, or CuO.

Glasses which are particularly suitable consist essentially on the oxide basis as computed from the batch in percent by weight of 50–65% $SiO_2$, 2–6% $Al_2O_3$, 4–10% $Na_2O$, 4–10% $K_2O$, the total of $Na_2O$ and $K_2O$ being 13–15%, 10–15% BaO, and 3–15% $Ho_2O_3$. Additionally, the above-described glasses contain up to 1% $Li_2O$ and up to 2% fluorine computed as free fluorine, to aid in the melting of the glass. As has been pointed out above, the amount of holmium oxide is critical in order to produce a filter having the desired optical properties. The proportions of the other constituents of the glass, while not critical, are particularly desirable in order to produce a glass which has the requisite transmission in the ultra-violet region, which can be melted at normal glass-melting temperatures in conventional pots and/or furnaces, which can be formed in slabs without devitrification, and which possess adequate resistance to weathering by exposure to the atmosphere.

Examples of suitable glass compositions are set forth in Table I in which the constituents are set forth in percent by weight on the oxide basis as calculated from the batch, the fluorine content being set forth as computed as the free fluorine in excess of the oxide content.

*Table I*

|  | 1 | 2 | 3 |
|---|---|---|---|
| $SiO_2$ | 63.8 | 58.8 | 53.8 |
| $Al_2O_3$ | 4.7 | 4.7 | 4.7 |
| $Na_2O$ | 7.0 | 7.0 | 7.0 |
| $Li_2O$ | .6 | .6 | .6 |
| $K_2O$ | 7.0 | 7.0 | 7.0 |
| BaO | 11.8 | 11.8 | 11.8 |
| $Ho_2O_3$ | 5.1 | 10.1 | 15.1 |
| F | 1.4 | 1.4 | 1.4 |

The glass compositions of Table I can be produced by melting in pots or tanks at temperatures of 1400° C. to 1500° C. for a time of from about 2 to 8 hours the corresponding batch compositions set forth in Table II.

*Table II*

|  | 1 | 2 | 3 |
|---|---|---|---|
| Sand | 626.6 | 576.6 | 526.6 |
| $Al(OH)_3$ | 70.9 | 70.9 | 70.9 |
| $Na_2SiF_6$ | 21.8 | 21.8 | 21.8 |
| $LiCO_3$ | 15.0 | 15.0 | 15.0 |
| $K_2CO_3$ | 102.2 | 102.2 | 102.2 |
| $Ba(OH)_2$ | 132.9 | 132.9 | 132.9 |
| $NaCO_3$ | 107.2 | 107.2 | 107.2 |
| Starch | 50.0 | 50.0 | 50.0 |
| $Ho_2O_3$ | 50.0 | 100.0 | 150.0 |

The preferred composition for the color filter of this invention consists of glass having the composition of Example 2 in Table I. The filter can be produced by melting the batch of Example 2 in Table II in a standard pot at a temperature of 1450° C. for 8 hours. The molten glass is then rolled into sheet form in the conventional manner and then ground and polished to produce finished plates about ⅛ to ⅜-inch in thickness.

FIG. 1 illustrates the effect of the holmium oxide on the transmittance of the glass at wave-lengths of between 240 and 400 millimicrons. The curve numbered 0 shows the transmittance of the base glass of Examples 1-3 which are free of holmium oxide but have been melted under reducing conditions, whereas the curves numbered 1, 2, and 3 illustrate the transmittance of such glasses as are shown in Table I, respectively. As is shown by the curve of this drawing, color filters of this invention exhibit major transmittance valleys at wave-lengths of 242, 280, 289, and 334 millimicrons, minor transmittance valleys at 251, 260, 262, 291, 344, and 347 millimicrons, a major transmittance peak at 284 millimicrons, and minor transmittance peaks at 238, 251, 259, 273, 329, 340, 352, 376, and 399 millimicrons.

Figure 2:
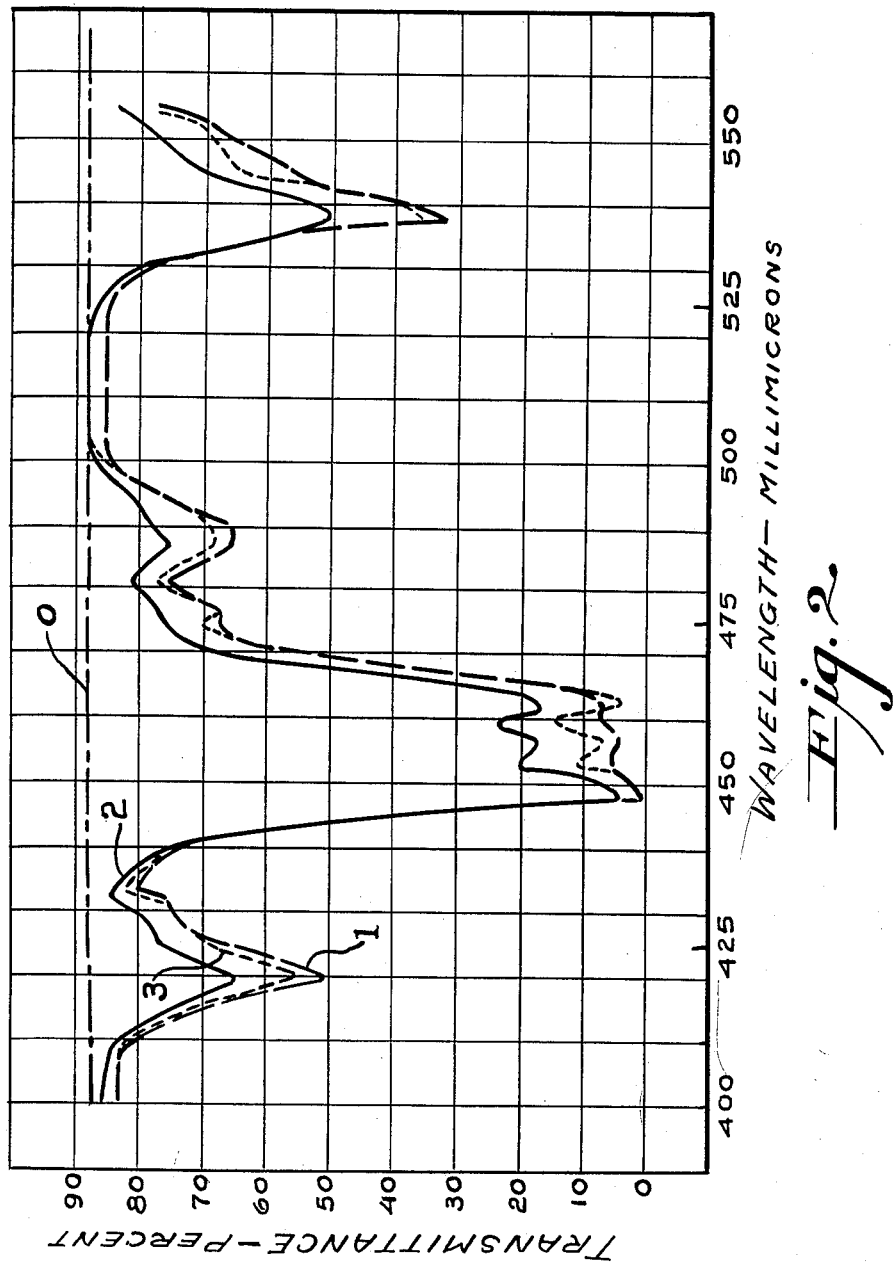
Figure 3:
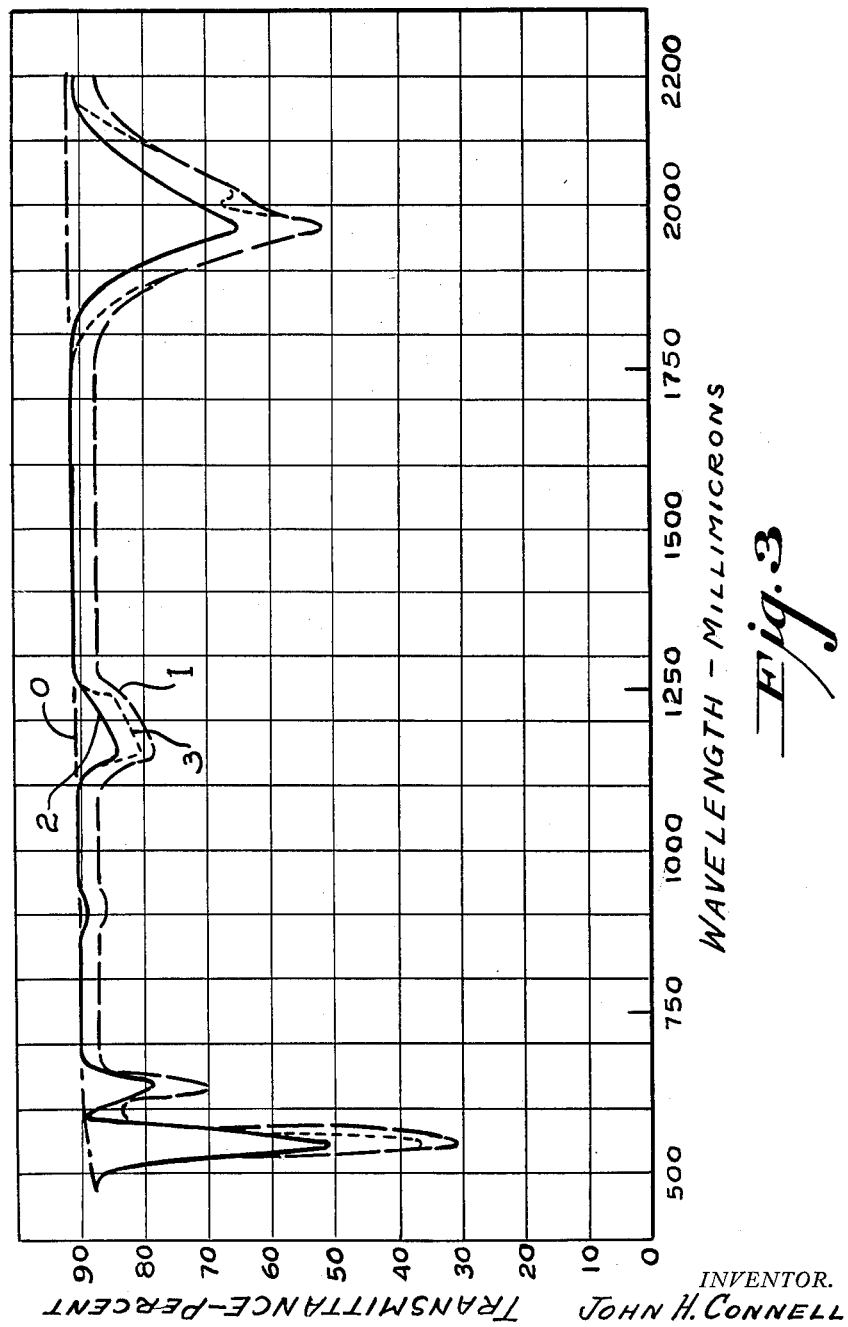

The transmittance of these same glass filters at wavelengths of 400 to 550 millimicrons and 500 to 2200 millimicrons is shown in FIG. 2 and FIG. 3, respectively, to illustrate that they also have utility for the calibration of spectrophotometers in the visible and infra-red portions of the spectrum. Thus, while they are of primary importance in the ultra-violet region of the radiation spectrum, they have the additional merit of providing calibration peaks throughout the entire range utilized in a spectrophotometer. As can be seen from an examination of these curves, major transmittance valleys are shown at 420, 448, 457, 463, 487, 538, 640, 1150, and 1970 millimicrons, major transmittance peaks are shown at 433 and 481 millimicrons, and a minor transmittance valley is shown at 900 millimicrons.

What is claimed is:

1. A color filter for calibrating a spectrophotometer comprising a plate of glass consisting essentially on the oxide basis as computed from the batch in percent by weight of 50–65% $SiO_2$, 2–6% $Al_2O_3$, 4–10% $Na_2O$, 4–10% $K_2O$, the total of $Na_2O$ and $K_2O$ being 13–15%, 10–15% $BaO$, and 3–15% $Ho_2O_3$.

2. A glass having specific, predetermined transmittance peaks and valleys in the ultra-violet region of the spectrum which consists essentially on the oxide basis as computed from the batch in percent by weight of 50–65% $SiO_2$, 2–6% $Al_2O_3$, 4–10% $Na_2O$, 4–10% $K_2O$, the total of $Na_2O$ and $K_2O$ being 13–15%, 10–15% $BaO$, and 3–15% $Ho_2O_3$.

References Cited in the file of this patent
UNITED STATES PATENTS
2,805,166    Loffler _____ Sept. 3, 1957